(12) United States Patent
Chen et al.

(10) Patent No.: US 9,851,435 B2
(45) Date of Patent: Dec. 26, 2017

(54) ELECTRONIC DEVICE AND SIGNAL GENERATING CIRCUIT

(71) Applicant: HTC Corporation, Taoyuan (TW)

(72) Inventors: Yen-Hsun Chen, Taoyuan (TW);
Shen-Chun Fan, Taoyuan (TW);
Mu-Shiuan Lin, Taoyuan (TW);
Wei-Chih Chang, Taoyuan (TW);
Chung-Ming Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 93 days.

(21) Appl. No.: 14/967,382

(22) Filed: Dec. 14, 2015

(65) Prior Publication Data

US 2017/0168152 A1  Jun. 15, 2017

(51) Int. Cl.

| G01S 3/02 | (2006.01) |
|---|---|
| G01S 11/06 | (2006.01) |
| G01B 11/14 | (2006.01) |
| G01B 13/12 | (2006.01) |
| G01B 17/00 | (2006.01) |
| G01B 21/16 | (2006.01) |
| G06F 3/01 | (2006.01) |

(52) U.S. Cl.
CPC .............. *G01S 11/06* (2013.01); *G01B 11/14*
(2013.01); *G01B 13/12* (2013.01); *G01B*
*17/00* (2013.01); *G01B 21/16* (2013.01); *G06F*
*3/011* (2013.01)

(58) Field of Classification Search
CPC .................................. G01S 5/14; G01S 11/06

USPC .................................. 342/386, 458, 463–465
See application file for complete search history.

(56) References Cited

U.S. PATENT DOCUMENTS

| 6,159,100 A | 12/2000 | Smith |
|---|---|---|
| 2005/0063556 A1 | 3/2005 | McEachen et al. |
| 2008/0069380 A1 | 3/2008 | Cheng |
| 2012/0020487 A1 | 1/2012 | Fried et al. |
| 2013/0023342 A1 | 1/2013 | Jung et al. |

FOREIGN PATENT DOCUMENTS

| WO | 2013115748 | 8/2013 |
|---|---|---|

OTHER PUBLICATIONS

"Search Report of European Counterpart Application," dated Apr. 19, 2017, p. 1-p. 8.

*Primary Examiner* — Dao Phan
(74) *Attorney, Agent, or Firm* — JCIPRNET (57) ABSTRACT

An electronic device including a signal generating circuit and a movable sensing circuit is provided. The signal generating circuit generates a sensory signal through a signal source. The movable sensing circuit generates a feedback signal in response to a detection signal from the signal generating circuit, and transmits the feedback signal to the signal generating circuit. The signal generating circuit obtains a first distance value between the signal source and the movable sensing circuit based on the feedback signal, and adjusts the intensity of the sensory signal according to the first distance value.

19 Claims, 4 Drawing Sheets

ELECTRONIC DEVICE AND SIGNAL GENERATING CIRCUIT

BACKGROUND OF THE INVENTION

1. Field of the Invention

The invention relates to an electronic device and a signal generating circuit, and particularly relates to an electronic device and a signal generating circuit capable of adjusting an intensity of a sensory signal.

2. Description of Related Art

With the development of science and technology, the electronic device is capable of brining the user to a virtual world constructed by the electronic device through integration of audio-visual effects and human-machine interface. To allow the user to perceive sounds, light, and various sensory inputs similar to the real world, a signal generating circuit having a high power element (e.g., light emitting diode) is usually required in the electronic device to simulate the real world situation. However, even though the electronic device is able to offer sensory stimuli to the user by transmitting sensory signals, the sensory signals generated by the signal generating circuit may also cause harm or discomfort to the human body. Thus, how to prevent the sensory signals from causing harm or discomfort to the human body has become an issue in designing the electronic device.

SUMMARY OF THE INVENTION

The invention provides an electronic device and a signal generating circuit capable of generating a sensory signal and adjusting an intensity of the sensory signal based on a distance value. Thus, harm or discomfort caused by the sensory signal to a human body may be prevented.

An electronic device according to an embodiment of the invention includes a signal generating circuit and a movable sensing circuit. The signal generating circuit generates a sensory signal through a signal source. The movable sensing circuit generates a feedback signal in response to a detection signal from the signal generating circuit, and transmits the feedback signal to the signal generating circuit. The signal generating circuit obtains a first distance value between the signal source and the movable sensing circuit based on the feedback signal, and adjusts the intensity of the sensory signal according to the first distance value.

According to an embodiment of the invention, the signal generating circuit detects an object within a scan range through a sensor, so as to generate an object sensing signal. The signal generating circuit calculates a second distance value between the signal source and the object based on the object sensing signal. The signal generating circuit further adjusts the intensity of the sensory signal based on the second distance value.

A signal generating circuit according to an embodiment of the invention includes a signal source and a sensor. The signal source generates a sensory signal. The sensor is near the signal source. Also, the sensor senses an object within a scan range, so as to generate an object sensing signal. The signal generating circuit calculates a distance value between the signal source and the object based on the object sensing signal, and the signal generating circuit adjusts an intensity of the sensory signal based on the distance value.

Based on above, the electronic device and the signal generating circuit according to the embodiments of the invention are capable of generating the sensory signal and adjusting the intensity of the sensory signal based on the distance value. Thus, harm or discomfort caused by the sensory signal to a human body may be prevented.

In order to make the aforementioned and other features and advantages of the invention comprehensible, several exemplary embodiments accompanied with figures are described in detail below.

DESCRIPTION OF THE EMBODIMENTS

Figure 1:
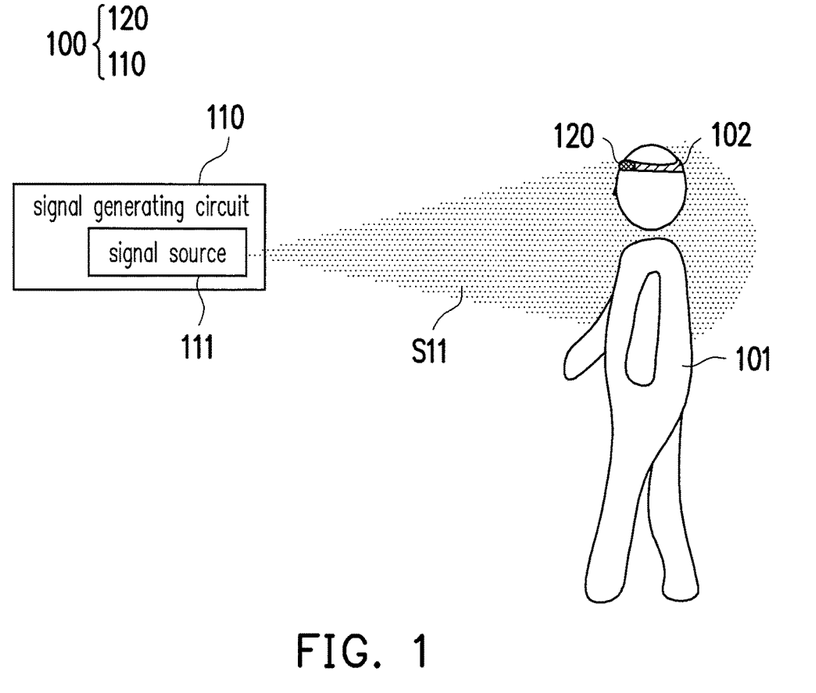
FIG. 1 is a schematic view illustrating an electronic device according to an embodiment of the invention.

FIG. 1 is a schematic view illustrating an electronic device according to an embodiment of the invention. As shown in FIG. 1, an electronic device 100 includes a signal generating circuit 110 and a movable sensing circuit 120. The signal generating circuit 110 includes a signal source 111, and the signal source 111 may generate a sensory signal S11. The sensory signal S11 may be an air flow, a water flow, a thermal energy, a light wave, a sound wave, or a combination thereof, for example. In other words, the signal generating circuit 110 may provide the user with visual, auditory, tactile, or smell senses through the sensory signal S11.

For example, the signal source 111 may be a light emitting diode, a laser diode, a flashlight, or various light emitting elements, for example. Thus, the signal generating circuit 110 may emit a light wave toward the user through the signal source 111, and the light wave may be infrared light (i.e., infrared ray), visible light, ultraviolet light (i.e., ultraviolet ray), or light in various forms, for example. In another embodiment, the signal source 111 may be a speaker, a horn, or various sound output elements, for example. In addition, the signal generating circuit 110 may output a sound wave through the signal source 111.

The movable sensing circuit 120 is independent from the signal generating circuit 110, so as to be arbitrarily disposed or fixed on another element. For example, as shown in FIG. 1, the movable sensing circuit 120 may be disposed or fixed on a head-mounted display (HMD) 102, and the head-mounted display 102 may be arranged on the head of a user 101. In another embodiment, the movable sensing circuit 120 may also be disposed or fixed on a wearable device, and the wearable device may be a smart watch, a smart glass, or a smart bracelet, for example.

It should be noted that the movable sensing circuit 120 may generate a feedback signal in response to a detection signal from the signal generating circuit 110. Moreover, the movable sensing circuit 120 may transmit the feedback signal to the signal generating circuit 110 in a wired or wireless manner. Furthermore, the signal generating circuit 110 may obtain a distance (i.e., a distance value) between the signal source 111 and the movable sensing circuit 120, and adjust an intensity of the sensory signal S11 based on the obtained distance value.

Figure 2:
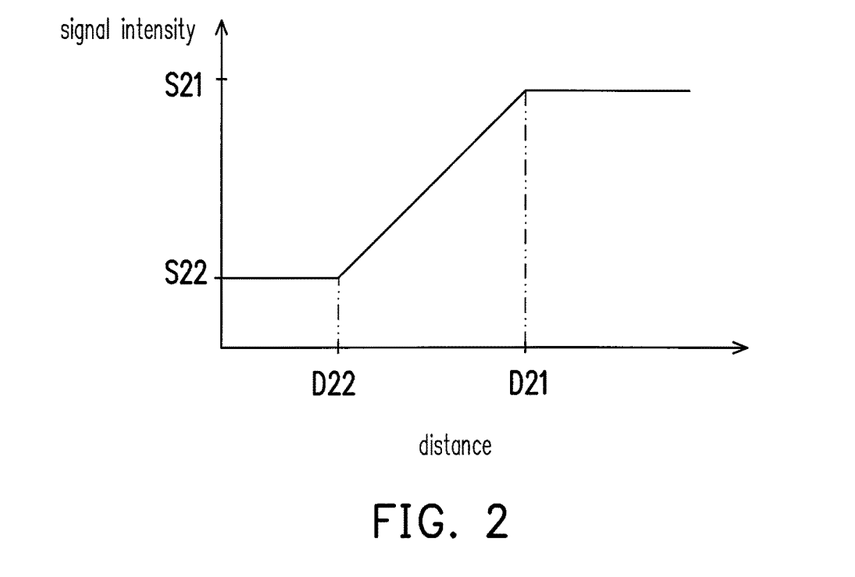
FIG. 2 is a schematic signal intensity diagram illustrating adjustment of a sensory signal according to an embodiment of the invention.

For example, FIG. 2 is a schematic signal intensity diagram illustrating adjustment of a sensory signal according to an embodiment of the invention. As shown in FIG. 2, the signal generating circuit 110 may compare the obtained distance value with a threshold value D21 (e.g., 5 meters) and a threshold value D22 (e.g., 30 centimeters). Specifically, when the distance value between the signal source 111 and the movable sensing circuit 120 is greater than the threshold value D21, the user 101 is distant enough from the signal source 111. Thus, the intensity of the sensory signal S11 may be maintained at a predetermined intensity S21 (e.g., the maximum intensity) through the signal generating circuit 110.

When the distance value between the signal source 111 and the movable sensing circuit 120 is between the threshold value D21 and the threshold value D22, the signal generating circuit 110 may adjust the intensity of the sensory signal S11 based on the obtained distance value, such that the intensity of the sensory signal S11 is directly proportional to the distance value between the signal source 111 and the movable sensing circuit 120. In other words, the signal generating circuit 110 may dynamically adjust the intensity of the sensory signal S11 based on the obtained distance value, so as to prevent the sensory signal S11 from causing harm or discomfort to the user 101. Besides, through the adjustment of the intensity of the sensory signal S11, the signal generating circuit 111 may correspondingly reduce a power consumption of the signal source 111, so as to effectively reduce power consumption of the circuit.

For example, the sensory signal S11 may include an air flow, a water flow, a thermal energy, a light wave, and a sound wave, for example. In practice, as the distance between the signal source 111 and the movable sensing circuit 120 changes, i.e., as the user 101 moves, the signal generating circuit 110 may dynamically adjust a flow speed or a flow rate of the air flow or the water flow. Moreover, the signal generating circuit 110 may also dynamically adjust an energy intensity of the radiated thermal energy, such that the user may sense different temperatures. Accordingly, a tactile comfort level of the user 101 may be increased. Moreover, the signal generating circuit 110 may also dynamically adjust components and concentrations of components of a gas in the air flow. For example, the gas in the air flow may include an atomized gas or a volatile gas, and the atomized gas or the volatile gas may be formed by an atomized or volatilized essential oil, scent, or aromatic. Thus, the signal generating circuit 110 may release different smells through flowing of the air flow, so as to increase the user's comfort level of smell. Moreover, the signal generating circuit 110 may also dynamically adjust amplitudes of the light wave and the sound wave, so as to timely change a volume of a sound and a brightness of the light wave generated, thereby increasing the user's auditory and visual comfort levels.

More specifically, when the distance value between the signal source 111 and the movable sensing circuit 120 is less than the threshold value D22, the user 101 is too close to the signal source 111. Thus, under such circumstance, the signal generating circuit 110 may keep the intensity of the sensory signal S11 at a minimum intensity, so as to significantly prevent the harm to the user caused by the sensory signal S11. For example, in an embodiment, the sensory signal S11 may be a laser beam (i.e., light wave), and a minimum intensity of the laser wave is set at 0.39 μW.

In another embodiment, the sensory signal S11 may be a sound wave, for example, and a minimum intensity of the sound wave may be set in correspondence with an operation time of the signal generating circuit 110. For example, when the operation time of the signal generating circuit 110 is less than ¼ hours, the minimum intensity of the sound wave may be set at 100 dB. When the operation time of the signal generating circuit 110 is between ¼ hours and ½ hours, the minimum intensity of the sound wave may be set at 97 dB. When the operation time of the signal generating circuit 110 is between ½ hours and 1 hour, the minimum intensity of the sound wave may be set at 94 dB. When the operation time of the signal generating circuit 110 is between 1 hour and 2 hours, the minimum intensity of the sound wave may be set at 91 dB. When the operation time of the signal generating circuit 110 is between 2 hours and 4 hours, the minimum intensity of the sound wave may be set at 88 dB. When the operation time of the signal generating circuit 110 is between 4 hours and 8 hours, the minimum intensity of the sound wave may be set at 85 dB.

It should be noted that the signal generating circuit 110 may use the sensory signal S11 or a radio wave as the detection signal transmitted to the movable sensing circuit. Thus, the movable sensing circuit 120 may generate the feedback signal relating to the distance value based on the sensory signal S11 or the radio wave, such that the signal generating circuit 110 may adjust the intensity of the sensory signal S11 based on the distance value.

Figure 3:
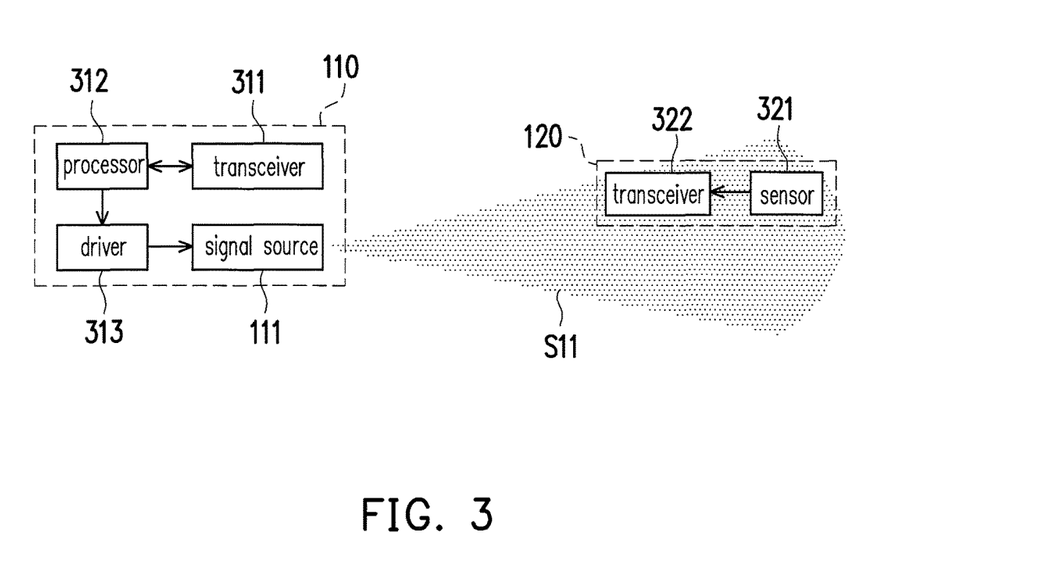
FIG. 3 is a schematic block view illustrating an electronic device according to an embodiment of the invention.

For example, FIG. 3 is a schematic block view illustrating an electronic device according to an embodiment of the invention. As shown in FIG. 3, the signal generating circuit 110 further includes a transceiver 311, a processor 312, and a driver 313, and the movable sensing circuit 120 includes a sensor 321 and a transceiver 322. In the embodiment shown in FIG. 3, the detection signal transmitted by the signal generating circuit 110 to the movable sensing circuit 120 is formed by the sensory signal S11, and the feedback signal transmitted by the movable sensing circuit 120 includes a plurality of sensing signals.

Specifically, the sensor 321 of the movable sensing circuit 120 may detect the sensing sensory signal S11 and generate the sensing signals based on a detection result. In addition, the movable sensing circuit 120 may transmit the sensing signals to the signal generating circuit 110 through the transceiver 322. For example, the transceiver 322 may use a radio wave to carry the sensing signals, such that the sensing signals may be transmitted to the signal generating circuit 110 in a wireless manner.

Moreover, the signal generating circuit 110 may receive the sensing signals by using the transceiver 311. The processor 312 may calculate the distance value between the signal source 111 and the movable sensing circuit 120 based on the sensing signals. More specifically, the sensory signal S11 may also be used to position the movable sensing circuit 120. Thus, the signal generating circuit 110 may calculate the distance between the signal source 111 and the movable sensing circuit 120 according to the sensing signals generated by the movable sensing circuit 120 in response to the sensory signal S11. For example, the sensory signal S11 may be a light wave, and the sensor 321 may include plurality of light sensing elements, such as charge-coupled devices (CCDs). Thus, the signal generating circuit 110 may calculate the position of the movable sensing circuit 120 according to the sensing signals generated by the light sensing elements, so as to obtain the distance value between the signal source 111 and the movable sensing circuit 120.

The processor 312 may further generate a control signal based on the distance value. The driver 313 generates an output signal based on the control signal, so as to drive the signal source 111. In an embodiment, as shown in FIG. 2, the processor 312 may compare the distance value with the threshold value D21 (e.g., 5 meters) and the threshold value D22 (e.g., 30 centimeters), and generate the control signal based on a comparison result. Also, when the distance value is greater than the threshold value D21, the driver 313 may maintain the output signal at a predetermined level in response to the control signal, such that the intensity of the sensory signal S11 is maintained at the predetermined intensity S21 (e.g., the maximum intensity).

When the distance value is between the threshold value D21 and the threshold value D22, the driver 313 may adjust the level of the output signal in response to the control signal, such that the intensity of the sensory signal S11 is directly proportional to the distance value. When the distance value is less than the threshold value D22, the driver 313 may maintain the output signal at the minimum level in response to the control signal, such that the intensity of the sensory signal S11 is maintained at a minimum intensity S22. Besides, in an embodiment, the minimum level of the output signal may be a ground level, for example. In other words, when the distance value is less than the threshold value D22, the processor 312 may disable the driver 313 by using the control signal, such that the signal source 111 stops generating the sensory signal S11.

It should be noted that, in the embodiment shown in FIG. 3, the movable sensing circuit 120 transmits the feedback signal in a wireless manner. However, in another embodiment, the movable sensing circuit 120 may also transmit the feedback signal in a wired manner. For example, people having ordinary skill in the art may replace the transceiver 311 and the transceiver 322 with a wired connection interface based on the design requirement. Also, in FIG. 3, the driver 313 is disposed external to the signal source 111. In another embodiment, the driver 313 may also be embedded in the signal source 111, for example.

Figure 4:
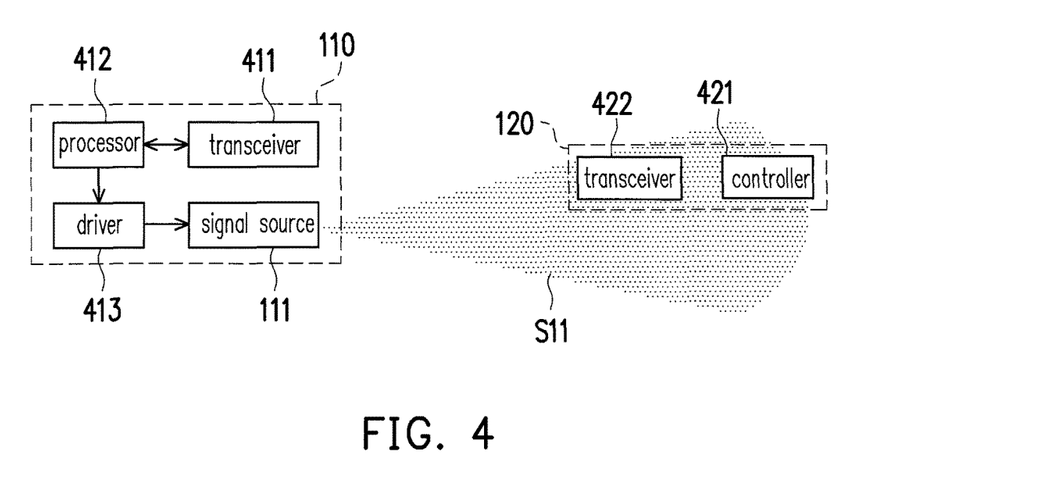
FIG. 4 is a schematic block view illustrating an electronic device according to another embodiment of the invention.

FIG. 4 is a schematic block view illustrating an electronic device according to another embodiment of the invention. As shown in FIG. 4, the signal generating circuit 110 further includes a transceiver 411, a processor 412, and a driver 413, and the movable sensing circuit 120 includes a controller 421 and a transceiver 422. In the embodiment shown in FIG. 4, the signal generating circuit 110 further transmits a radio wave as the detection signal. Also, the feedback signal transmitted by the movable sensing circuit 120 includes the distance value between the signal source 111 and the movable sensing circuit 120.

Specifically, the transceiver 422 may receive the radio wave transmitted by the signal generating circuit 110 and generate a signal intensity value, such as a received signal strength indicator (RSSI) value, based on the received radio wave. The controller 421 may calculate the distance value between the signal source 111 and the movable sensing circuit 120 based on the signal intensity value, and the distance value is included in the feedback signal. In addition, the movable sensing circuit 120 may transmit the distance value to the signal generating circuit 110 through the transceiver 422.

Besides, the signal generating circuit 110 may receive the distance value calculated by the movable sensing circuit 120 through the transceiver 411. The processor 412 may generate the control signal based on the distance value. The driver 413 may generate the output signal based on the control signal, so as to drive the signal source 111. Similar to the embodiment of FIG. 3, the processor 412 may compare the distance value with the threshold value D21 and the threshold value D22 in FIG. 2, and generate the control signal based on the comparison result. Also, people having ordinary skill in the art may replace the transceiver 411 and the transceiver 422 with a wired connection interface based on the design requirement, and the driver 413 may be embedded in the signal source 111, for example. Details in connection with the respective components in the signal generating circuit 110 of FIG. 4 are already included in the previous embodiments, and thus not repeated in the following.

It should be noted that, in the embodiments shown in FIGS. 1, 3, and 4, the electronic device 100 adjusts the intensity of the sensory signal S11 based on the distance value between the signal source 111 and the movable sensing circuit 120, so as to prevent the sensory signal S11 from causing harm and discomfort to the user 101. In another embodiment, a sensor may be further disposed in the signal generating circuit 110 of the electronic device 100, and the intensity of the sensory signal S11 may be adjusted based on a sensing result of the sensor. Accordingly, the electronic device 100 may further prevent the sensory signal from causing harm or discomfort to a person other than the user 101.

Figure 5:
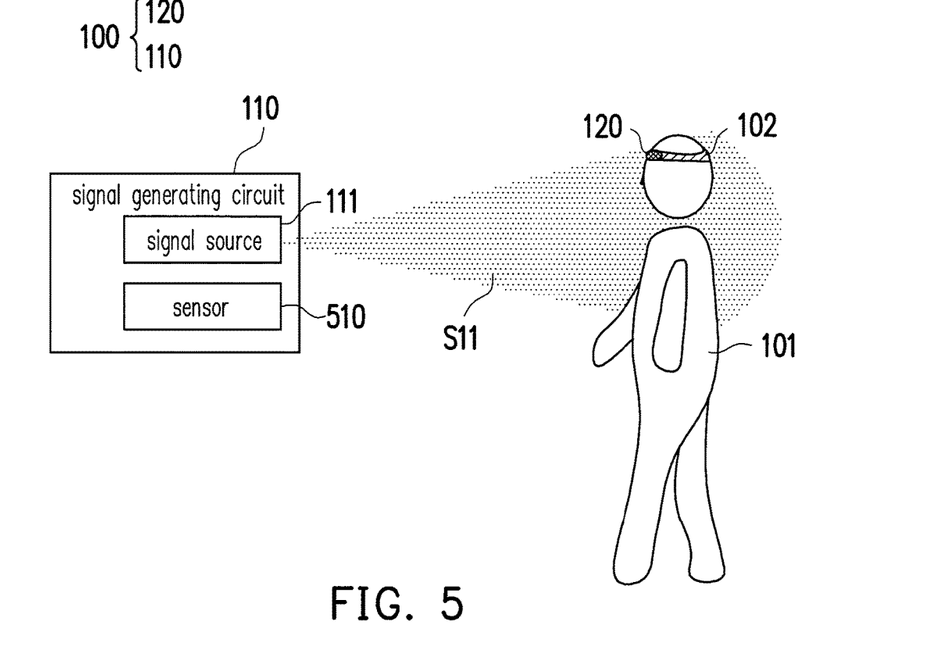
FIG. 5 is a schematic view illustrating an electronic device according to another embodiment of the invention.

For example, FIG. 5 is a schematic block view illustrating an electronic device according to another embodiment of the invention. Compared with FIG. 1, the signal generating circuit 110 of FIG. 5 further includes a sensor 510. Specifically, the sensor 510 may detect an object (e.g., a human body) within a scan range and generate an object sensing signal. In other words, when there is a person other than the user 101 entering the scan range of the sensor 510, the sensor may generate a corresponding object sensing signal. The sensor 510 may be a proximity sensor or a distance sensor.

The signal generating circuit 110 may calculate a distance (i.e., distance value) between the signal source 111 and the object based on the object sensing signal. In other words, in addition to obtaining the distance value (i.e., the first distance value) between the signal source 111 and the movable sensing circuit 120 based on the feedback signal, the signal generating circuit 110 may further calculate the distance value (i.e., the second distance value) between the signal source 111 and the object based on the object sensing signal. Moreover, the signal generating circuit 110 may adjust the intensity of the sensory signal S11 based on the first distance value and the second distance value.

For example, as shown in FIG. 2, the signal generating circuit 110 may obtain a minimum distance value of the first distance value and the second distance value and compare the minimum distance value with the threshold value D21 (e.g., 5 meters) and the threshold value D22 (e.g., 30 centimeters). When the minimum distance value is greater than the threshold value D21, the signal generating circuit 110 may maintain the intensity of the sensory signal S11 at the predetermined intensity S21 (e.g., the maximum intensity). When the minimum distance value is between the threshold value D21 and the threshold value D22, the signal generating circuit 110 may adjust the intensity of the sensory signal S11 based on the minimum distance value, such that the intensity of the sensory signal S11 is directly proportional to the minimum distance value. When the minimum distance value is less than the threshold value D22, the signal generating circuit 110 may maintain the intensity of the sensory signal S11 at the minimum intensity S22.

Figure 6:
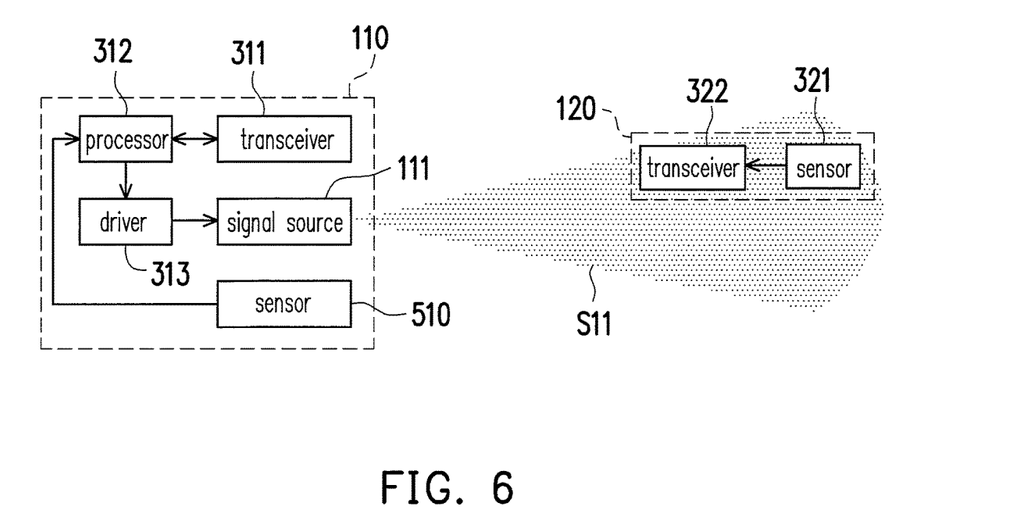
FIGS. 6 and 7 are schematic block views illustrating an electronic device according to another embodiment of the invention.
Figure 7:
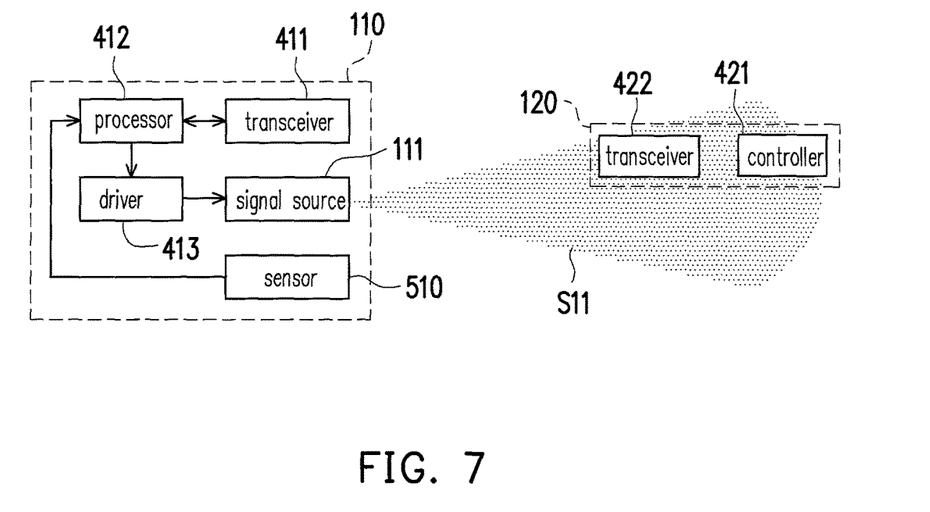

Following the same logic, the sensor 510 may also be disposed in the signal generating circuit 110 in the embodiments of FIGS. 3 and 4, so as to protect people other than the user 101. For example, FIGS. 6 and 7 are block views illustrating an electronic device according to another embodiment of the invention. Compared with FIGS. 3 and 4, the signal generating circuit 110 in FIGS. 6 and 7 further includes the sensor 510. Specifically, the sensor 510 may detect an object (e.g., a human body) within the scan range and generate the object sensing signal. Accordingly, in addition to obtaining the distance value (i.e., the first distance value) between the signal source 111 and the movable sensing circuit 120 based on the feedback signal, the processor 312 (or the processor 412) may further calculate the distance value (i.e., the second distance value) between the signal source 111 and the object based on the object sensing signal. The processor 312 (or the processor 412) may generate the control signal based on the first distance value or the second distance value, so as to control the driver in the back end.

For example, the processor 312 (or the processor 412) may obtain the minimum distance value of the first distance value and the second distance value. Also, as shown in FIG. 2, the processor 312 (or the processor 412) may compare the minimum distance value with the threshold value D21 and the threshold value D22 and generate the control signal based on the comparison result. When the minimum distance value is greater than the threshold value D21, the driver in the back end may maintain the output signal at a predetermined level in response to the control signal, such that the intensity of the sensory signal S11 is maintained at the predetermined intensity S21 (e.g., the maximum intensity). When the minimum distance value is between the threshold value D21 and the threshold value D22, the driver in the back end may adjust the level of the output signal in response to the control signal, such that the intensity of the sensory signal S11 is directly proportional to the minimum distance value. When the minimum distance value is less than the threshold value D22, the driver in the back end may maintain the output signal at the minimum level in response to the control signal, such that the intensity of the sensory signal S11 is maintained at the minimum intensity S22. Details in connection with the respective components in the embodiments from FIGS. 5 to 7 are already included in the previous embodiments, and thus not repeated in the following.

Figure 8:
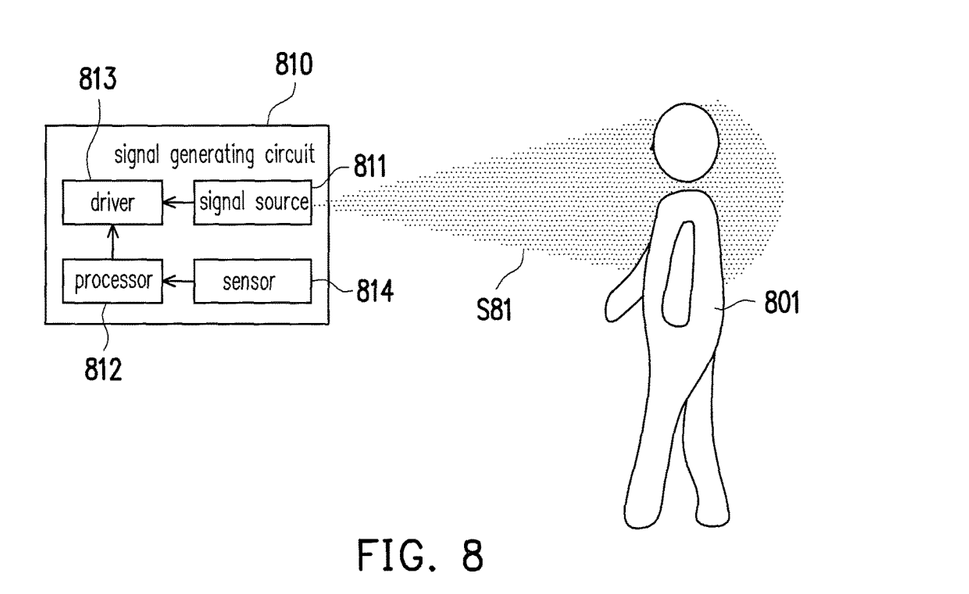
FIG. 8 is a schematic block view illustrating a signal generating circuit according to another embodiment of the invention.

It should be noted that the sensor 510 of the signal generating circuit 110 may also be configured to detect the user 101. Thus, in another embodiment, the signal generating circuit 110 may also use the sensing result of the sensor 510 to adjust the intensity of the sensory signal S11. For example, FIG. 8 is a schematic block view illustrating a signal generating circuit according to another embodiment of the invention. As shown in FIG. 8, a signal generating circuit 810 includes a signal source 811, a processor 812, a driver 813, and a sensor 814.

The signal source 811 may generate a sensory signal S81. The sensor 814 is near the signal source 811 and senses an object (e.g., a user 801) within a scan range, so as to generate the object sensing signal. Also, the processor 812 may calculate the distance value between the signal source 811 and the object based on the object sensing signal, and may generate the control signal based on the distance value. The driver 813 may generate the output signal based on the control signal, so as to drive the signal source 811 in the back end. In other words, the signal generating circuit 810 may adjust the intensity of the sensory signal S81 based on the distance value between the signal source 811 and the object.

For example, as shown in FIG. 2, the processor 812 may compare the distance value between the signal source 811 and the object based on the threshold value D21 (e.g., 5 meters) and the threshold value D22 (e.g., 30 centimeters). When the distance value between the signal source 811 and the object is greater than the threshold value D21, the driver 813 may maintain the output signal at the predetermined level in response to the control signal, such that the signal generating circuit 810 may maintain the intensity of the sensory signal S81 at the predetermined intensity S21 (e.g., the maximum intensity). When the distance value between the signal source 811 and the object is between the threshold value D21 and the threshold value D22, the driver 813 may adjust the level of the output signal in response to the control signal. The signal generating circuit 810 may adjust the intensity of the sensory signal S81 based on the distance value, such that the intensity of the sensory signal S81 is directly proportional to the distance value. When the distance value between the signal source 811 and the object is less than the threshold value D22, the driver 813 may maintain the output signal at the minimum level in response to the control signal, such that the signal generating circuit 810 may maintain the intensity of the sensory signal S81 at the minimum intensity S22. Besides, the minimum level of the output signal may be a ground level, for example. In other words, when the distance value is less than the threshold value D22, the processor 812 may disable the driver 813 by using the control signal, such that the signal source 811 stops generating the sensory signal S81. In addition, details of the operations and configurations of the signal source 811 and the sensor 814 in the embodiment of FIG. 8 are similar to those of the signal source 111 and the sensor 510, and thus not repeated in the following.

In view of the foregoing, the feedback signal of the movable sensing circuit is used in the invention to obtain the distance value (i.e., the first distance value) between the signal source and the movable sensing circuit, and the object sensing signal generated by the sensor in the signal generating circuit is used in the invention to obtain the distance value (i.e., the second distance value) between the signal source and the object. Moreover, the signal generating circuit may adjust the intensity of the sensory signal based on one of the first distance value and the second distance value, or the signal generating circuit may also adjust the intensity of the sensory signal based on the first distance value and the second distance value at the same time. Thus, the harm or discomfort caused by the sensory signal to the human body may be prevented, and the power consumption of the circuit may be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An electronic device, comprising:
   a signal generating circuit, generating a sensory signal through a signal source; and
   a movable sensing circuit, generating a feedback signal in response to a detection signal of the signal generating circuit and transmitting the feedback signal to the signal generating circuit, wherein the signal generating circuit obtains a first distance value between the signal source and the movable sensing circuit based on the feedback signal, and adjusts an intensity of the sensory signal based on the first distance value.

2. The electronic device as claimed in claim 1, wherein when the first distance value is greater than a first threshold value, the signal generating circuit sets the intensity of the sensory signal at a predetermined intensity; when the first distance value is between the first threshold value and a second threshold value, the signal generating circuit adjusts the intensity of the sensory signal based on the first distance value, such that the intensity of the sensory signal is directly proportional to the first distance value; and when the first distance value is less than the second threshold value, the signal generating circuit sets the intensity of the sensory signal at a minimum intensity.

3. The electronic device as claimed in claim 1, wherein the signal generating circuit detects an object within a scan range by using a sensor, so as to generate an object sensing signal, and calculates a second distance value between the signal source and the object based on the object sensing signal; and wherein the signal generating circuit further adjusts the intensity of the sensory signal based on the second distance value.

4. The electronic device as claimed in claim 3, wherein a processor obtains a minimum distance value of the first distance value and the second distance value; when the minimum distance value is greater than a first threshold value, the signal generating circuit sets the intensity of the sensory signal at a predetermined intensity; when the minimum distance value is between the first threshold value and a second threshold value, the signal generating circuit adjusts the intensity of the sensory signal based on the minimum distance value, such that the intensity of the sensory signal is directly proportional to the minimum distance value; and when the minimum distance value is less than the second threshold value, the signal generating circuit sets the intensity of the sensory signal at a minimum intensity.

5. The electronic device as claimed in claim 1, wherein the detection signal is formed by the sensory signal, the feedback signal comprises a plurality of sensing signals, and the movable sensing circuit comprises:
a first sensor, detecting the sensory signal and generating the sensing signals based on a detection result; and
a first transceiver, transmitting the sensing signals to the signal generating circuit.

6. The electronic device as claimed in claim 5, wherein the signal generating circuit comprises:
a second transceiver, receiving the sensing signals from the first transceiver;
a processor, calculating the first distance value based on the sensing signals and generating a control signal based on the first distance value; and
a driver, generating an output signal based on the control signal to drive the signal source.

7. The electronic device as claimed in claim 6, wherein when the first distance value is greater than a first threshold value, the driver maintains the output signal at a predetermined level in response to the control signal; when the first distance value is between the first threshold value and the second threshold value, the driver adjusts a level of the output signal in response to the control signal; and when the first distance value is less than the second threshold value, the driver maintains the output signal at a minimum level in response to the control signal.

8. The electronic device as claimed in claim 6, wherein the signal generating circuit further comprises:
a second detector, detecting an object within a scan range to generate an object sensing signal; wherein the processor calculates a second distance value between the signal source and the object based on the object sensing signal, and the processor further generates the control signal based on the second distance value.

9. The electronic device as claimed in claim 1, wherein the detection signal is formed by a radio wave generated by the signal generating circuit, the feedback signal comprises the first distance value, and the movable sensing circuit comprises:
a first transceiver, receiving the radio wave and generates a signal intensity value based on the received radio wave; and
a controller, calculating the first distance value based on the signal intensity value, wherein the first transceiver transmits the first distance value to the signal generating circuit.

10. The electronic device as claimed in claim 9, wherein the signal generating circuit comprises:
a second transceiver, receiving the first distance value from the first transceiver;
a processor, generating a control signal based on the first distance value; and
a driver, generating an output signal based on the control signal to drive the signal source.

11. The electronic device as claimed in claim 10, wherein when the first distance value is greater than a first threshold value, the driver maintains the output signal at a predetermined level in response to the control signal; when the first distance value is between the first threshold value and the second threshold value, the driver adjusts a level of the output signal in response to the control signal; and when the first distance value is less than the second threshold value, the driver maintains the output signal at a minimum level in response to the control signal.

12. The electronic device as claimed in claim 10, wherein the signal generating circuit further comprises:
a second detector, detecting an object within a scan range to generate an object sensing signal; wherein the processor calculates a second distance value between the signal source and the object based on the object sensing signal, and the processor further generates the control signal based on the second distance value.

13. The electronic device as claimed in claim 1, wherein the sensory signal is an air flow, a water flow, a thermal energy, a light wave, or a sound wave.

14. The electronic device as claimed in claim 1, wherein the movable sensing circuit is disposed on a wearable device or a head-mounted display.

15. A signal generating circuit, comprising:
a signal source, generating a sensory signal; and
a sensor, near the signal sensory and sensing an object within a scan range, so as to generate an object sensing signal,
wherein the signal generating circuit calculates a distance value between the signal source and the object based on the object sensing signal, and the signal generating circuit adjusts an intensity of the sensory signal based on the distance value,
wherein when the distance value is greater than a first threshold value, the signal generating circuit sets the intensity of the sensory signal at a predetermined intensity; when the distance value is between the first threshold value and a second threshold value, the signal generating circuit adjusts the intensity of the sensory signal based on the distance value, such that the intensity of the sensory signal is directly proportional to the distance value; and when the distance value is less than the second threshold value, the signal generating circuit sets the intensity of the sensory signal at a minimum intensity.

16. The signal generating circuit as claimed in claim 15, wherein the first threshold value is 5 meters, and the second threshold value is 30 centimeters.

17. The signal generating circuit as claimed in claim 15, further comprising:
   a processor, calculating the distance value based on the object sensing signal and generating a control signal based on the distance value; and
   a driver, generating an output signal based on the control signal to drive the signal source.

18. The signal generating circuit as claimed in claim 17, wherein when the distance value is greater than a first threshold value, the driver maintains the output signal at a predetermined level in response to the control signal; when the distance value is between the first threshold value and the second threshold value, the driver adjusts a level of the output signal in response to the control signal; and when the distance value is less than the second threshold value, the driver maintains the output signal at a minimum level in response to the control signal.

19. The signal generating circuit as claimed in claim 18, wherein when the distance value is less than the second threshold value, the processor disables the driver by using the control signal, such that the signal source stops generating the sensory signal.

* * * * *